(12) United States Patent
Taib et al.

(10) Patent No.: US 7,254,615 B2
(45) Date of Patent: Aug. 7, 2007

(54) AD HOC TELECOMMUNICATIONS NETWORK MANAGEMENT AND ROUTING

(75) Inventors: Ronnie Bernard Francis Taib, Maroubra (AU); Maya Benson, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 857 days.

(21) Appl. No.: 10/363,440

(22) PCT Filed: Sep. 10, 2001

(86) PCT No.: PCT/EP01/10449

§ 371 (c)(1),
(2), (4) Date: Feb. 27, 2003

(87) PCT Pub. No.: WO02/23342

PCT Pub. Date: Mar. 21, 2002

(65) Prior Publication Data

US 2003/0177219 A1 Sep. 18, 2003

(30) Foreign Application Priority Data

Sep. 12, 2000 (EP) .................................. 00402510

(51) Int. Cl.
*G06F 15/16* (2006.01)
*G06F 15/173* (2006.01)
(52) U.S. Cl. ..................... 709/209; 709/238; 709/249
(58) Field of Classification Search ................ 709/209, 709/238, 249
See application file for complete search history.

(56) References Cited

U.S. PATENT DOCUMENTS 5,784,368 A 7/1998 Weigand et al.
6,098,096 A * 8/2000 Tsirigotis et al. ........... 709/213
6,175,747 B1 * 1/2001 Tanishima et al. ......... 455/562.1
2002/0042268 A1 * 4/2002 Cotanis ...................... 455/423
2002/0055978 A1 * 5/2002 Joon-Bo et al. ............ 709/209
2003/0149794 A1 * 8/2003 Morris et al. ............... 709/249

FOREIGN PATENT DOCUMENTS

EP       0 993 163 A    4/2000
EP       1 014 266 A    6/2000
WO       WO 99/17566    4/1999

* cited by examiner

*Primary Examiner*—Rupal Dharia
*Assistant Examiner*—Chirag R Patel
(74) *Attorney, Agent, or Firm*—Lalita W. Pace; Brian M. Mancini

(57) ABSTRACT

An ad hoc telecommunications network comprises a plurality of mobile devices, cached data being distributed amongst the devices. A manager device is elected for example based on highest compared received signal strength amongst the devices to manage the distributed data. The manager election can by dynamically up-dated to compensate for changes in the network parameter for example devices entering or leaving the network, or physical relocation of the devices within the network. In addition, the ad hoc network can communicate with a fixed infrastructure, the fixed infrastructure maintaining a table identifying a gateway device for direct communication with the fixed infrastructure, allowing communication with a mobile device within the ad hoc network. Yet further the ad hoc network can provide a communications route between two remote fixed infrastructures.

12 Claims, 7 Drawing Sheets

−PRIOR ART−

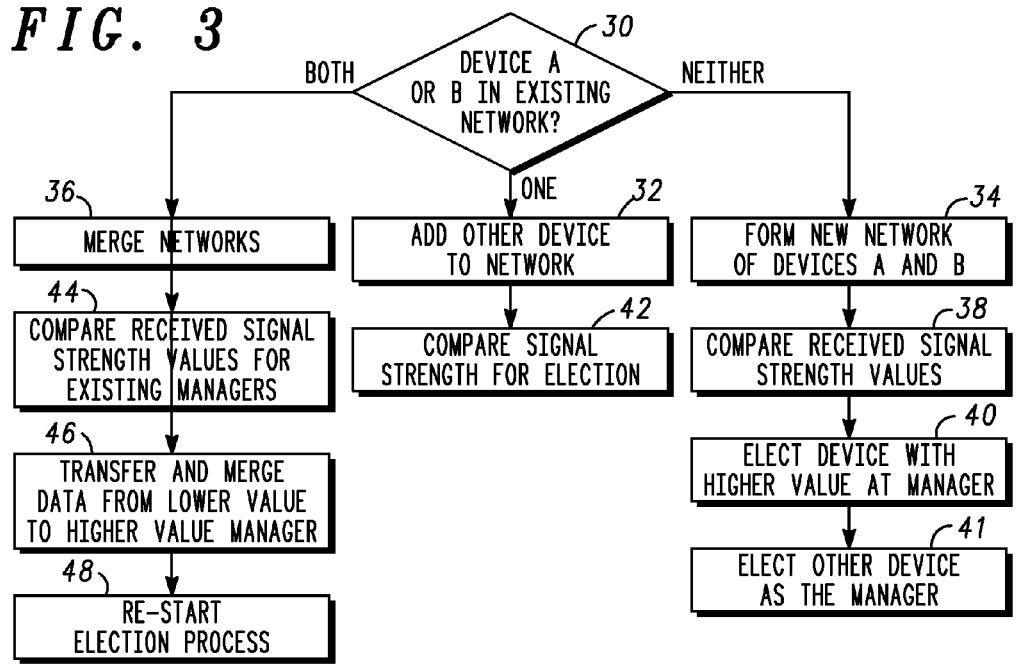
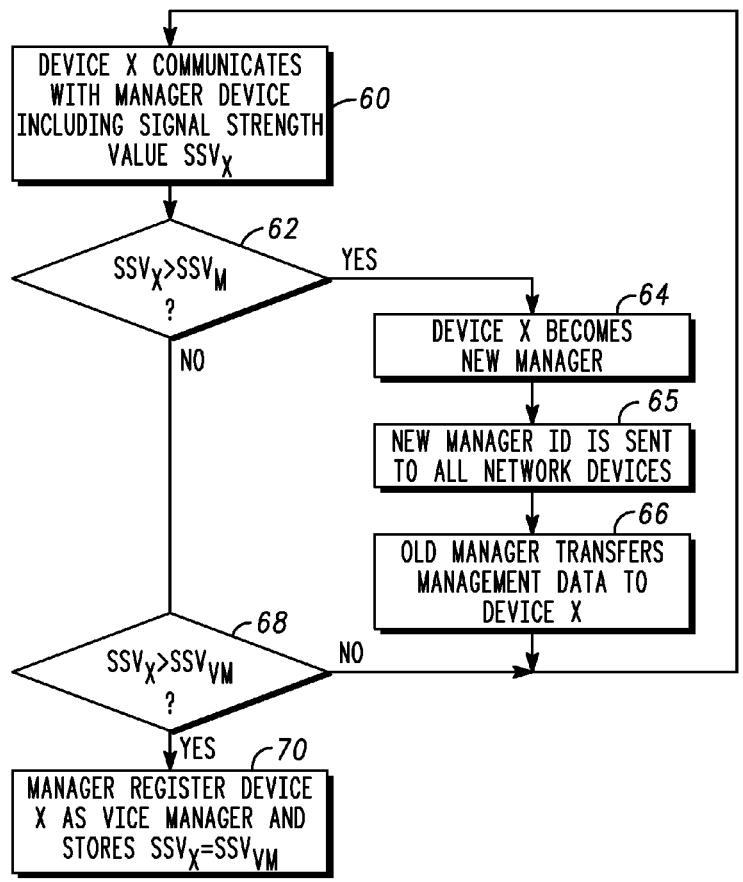

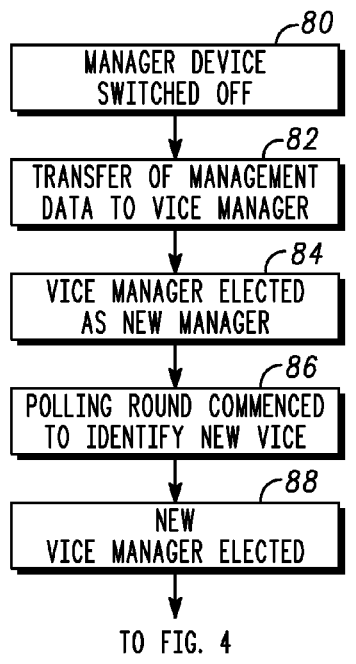
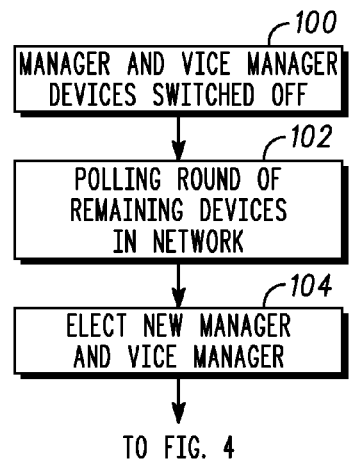
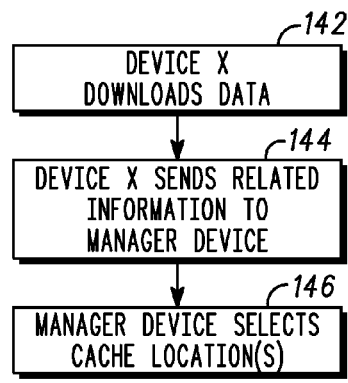
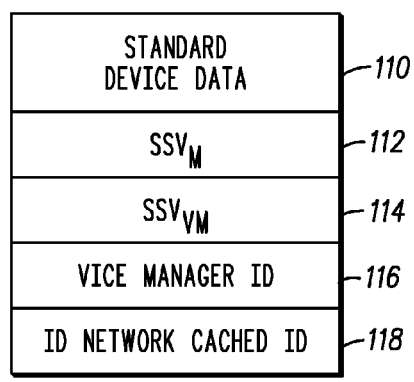
FIG. 5
FIG. 6
FIG. 7B
FIG. 7A

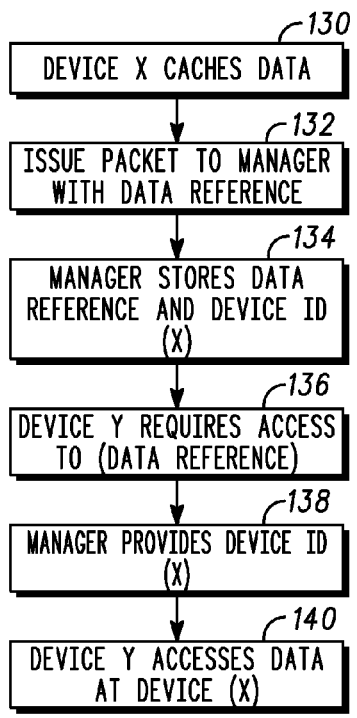
FIG. 8
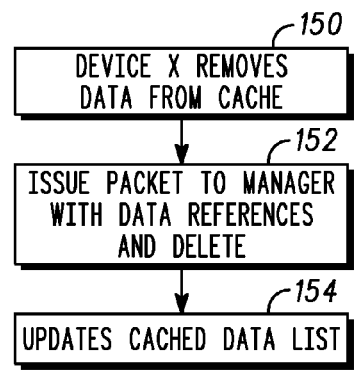
FIG. 9
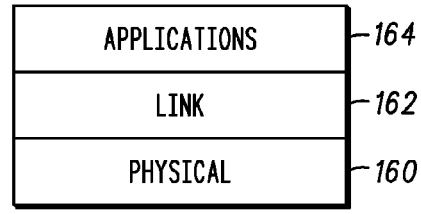
FIG. 10
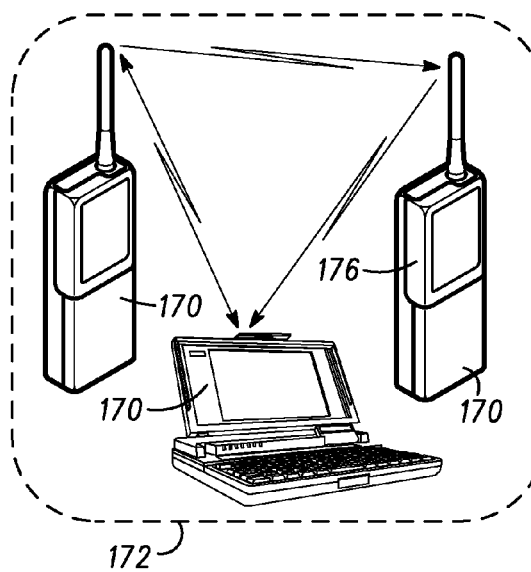
FIG. 11
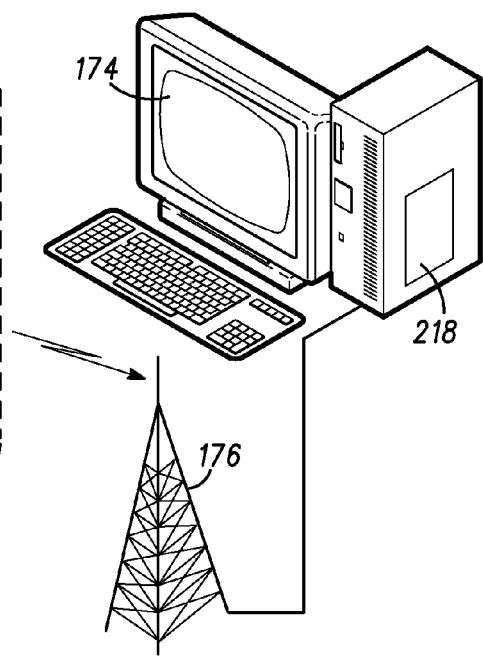

AD HOC TELECOMMUNICATIONS NETWORK MANAGEMENT AND ROUTING

The invention relates to an ad hoc telecommunications network, for example in relation to a telecommunications network including mobile devices which can individually move into and out of range of the network.

A known proposal for an ad hoc network under the emerging Bluetooth standard is shown in FIG. 1. The skilled person will be familiar with the Bluetooth specification which has been drawn up by leaders in the telecommunications field including the present applicants. Further information concerning the Bluetooth specification is available from www.Bluetooth.com.

The ad hoc network is designated generally 10 and includes a plurality of devices including mobile or cell phones 12,14 and a personal digital assistant 16. The network shown is therefore a heterogeneous network of various devices although it will be appreciated that a network of similar devices, a homogeneous network, can of course also be formed. Under the Bluetooth system an ad hoc network is sometimes termed a "piconet". Ad hoc networks are alternatively known as "private networks".

A feature of ad hoc networks is that the constituent devices will change as the devices move into and out of range of the network, where the devices are mobile. For example under the Bluetooth system the operative range of any device is generally approximately 10 meters as the result of which the network can be very dynamic.

However it is necessary to provide a system for managing such a network in view of the dynamic nature of the network as a result of devices entering or leaving the network. Although, for example, the Bluetooth system provides within each network a single master device to which the remaining devices are slave, the master device is merely determined as the device which initiates the network, and the master/slave relationship purely governs the connection in communication procedures.

In another aspect, referring once again to FIG. 1, the ad hoc network allows access to the fixed network infrastructure 19 (uplink) via a fixed access point such as a PC (personal computer) 18 (or alternatively through a base station, not shown). Any member of the ad hoc network can access the fixed network even if it cannot reach the fixed network directly. For example as shown in FIG. 1, device 12 can reach the fixed network via device 14 which in turn communicates with fixed device 18. In this arrangement, therefore, device 14 acts as a gateway for the other devices.

However in this system there is no equivalent capability for a downlink from the fixed infrastructure to a device in the network if direct communication is not available as the communication passed to the mobile device is not defined in the fixed infrastructure.

In a further aspect, in existing systems or proposed systems multiple devices may individually access common data from a fixed infra structure giving rise to inefficiency and unnecessary duplication.

According to the invention there is provided an ad hoc telecommunications network comprising a plurality of devices, in which data is distributed amongst the devices and a device is designated manager device for managing the distributed data. As a result data can be distributed more efficiently around the network and the dynamic nature of an ad hoc network can be accommodated.

The manager device designation is preferably carried out dynamically based on a pre-selected network parameter, for example the relative average received signal strength value for each device from the other devices in the network, and the designated manager device is the device having the highest value or the pre-selected network parameter is the signal transmission strength for each device. Accordingly the best placed device at any time becomes the manager device, and this is updated constantly to compensate for devices moving within the network. Preferably each time a non-manager device communicates with the manager device, it sends an up-date value and, if this value exceeds the manager device value then the non-manager device is designated manager device.

The network preferably further comprises a designated vice manager device and if the manager device leaves the network, the vice manager device is designated manager device. Even if the manager device is simply switched off, therefore, continuous network management is assured.

Preferably on initiation of a network or addition or departure of one or more devices, manager designation is carried out to ensure that ad hoc networks can form and reform dynamically without prejudicing data management.

The manager device preferably stores a record of data location for data distributed amongst the devices and as each device caches or deletes data it preferably notifies the manager device which up-dates its record. Preferably a non-manager device can request the location of data distributed amongst the devices from the manager device for direct or indirect access to that data. As a result data distribution is logged and simplified and data duplication does not occur as unnecessary download requests are avoided.

Preferably the manager device, on leaving the network, transfers its manager device data to a newly designated manager device, again allowing continuous network management.

Preferably manager device capability is inherent in each device in the network and implemented by a respective software agent hosted by the device. Software agents allow a distributed and interactive management environment.

In one preferred embodiment the devices are Bluetooth enabled for communication.

According to the present invention there is further provided a communication device for an ad hoc telecommunications network as described above, the device comprising a communications application and a network management application enabling the device to act as designated manager device. The network management application is preferably implemented by a software agent hosted on the device and the communication application is preferably Bluetooth implemented.

According to the invention there is further provided a method of managing data distributed across an ad hoc telecommunications network comprising a plurality of devices in which data is distributed amongst the devices, a device is designated manager device and the manager device manages the distributed data. Each time a non-manager device communicates with the manager device, it preferably sends an up-date value of a pre-selected network parameter and, if this value exceeds the manager device value then the non-manager device is designated manager device. Each non-manager device preferably communicates to the manager device a data reference for data it caches and the manager device preferably stores a record of the data reference and data location.

As each device caches or deletes data it preferably notifies the manager device which up-dates its record.

A non-manager device preferably requests the location of data distributed amongst the devices from the manager device for direct or indirect access to that data.

The manager device, on leaving the network, preferably transfers its manager device data to a newly designated manager device.

The invention further provides a telecommunications system implemented by a network, a device and a method as described above.

According to another aspect of the invention there is provided a telecommunications network including an ad hoc network of mobile devices in communication with one another, a target device and a fixed structure in communication with at least one mobile device of the ad hoc network, in which the fixed structure maintains a table identifying a gateway device in the ad hoc network for communicating with the target device. As a result a communication path to the target device is provided by the ad hoc network. The fixed structure table is preferably dynamically up-dated with changing parameters in the ad hoc network compensating for the dynamic nature of ad hoc networks. Preferably the fixed structure includes a plurality of base stations for communicating with a mobile device and the fixed structure table further identifies a base station for communication with each available mobile device. Preferably the fixed structure, when communicating with a target device, first attempts communication via the base station linked with the target device in the fixed structure table and, if connection is not available, communicates with the target device via the designated gateway device. This allows greater communication flexibility.

The ad hoc network may include a designated manager device which provides dynamically up-dated gateway data to the fixed structure for up-dating the fixed structure table.

The target device may be a device in the ad hoc network or the target device may be a second fixed structure and the ad hoc network further comprises or is in communication with an uplink gateway mobile device in communication with the target device providing a communication route between the first fixed structure and second fixed structure. In this second version, an additional communication route is thus provided by the ad hoc network. The ad hoc network preferably provides one of a plurality of communication routes between the fixed structures, the route used being selected on the basis of a predetermined condition. The routing options are increased transparent to the system, and the ad hoc network is thus one additional medium for transporting data efficiently based on data traffic generally.

The invention further provides a method of identifying a communication path between a fixed structure and a target device via an ad hoc network in which the fixed structure maintains a table specifying a gateway mobile device within the ad hoc network via which it can communicate with the target device, and identifies a communication path via the specified gateway mobile device.

The fixed structure table is preferably dynamically updated with changing parameters in the ad hoc network.

The ad hoc network preferably includes a designated manager device, and the manager device dynamically provides up-date gateway data to the fixed structure for up-dating the fixed structure table.

The target device is preferably a second fixed structure and the ad hoc network further comprises or is in communication with an uplink gateway mobile device in communication with the target device providing a communication route between the first fixed structure and second fixed structure, said route comprising one of a plurality of communication routes between the fixed structures, and in which the communication route to be used is selected on the basis of a predetermined condition.

The invention further provides a telecommunications system for communication between a fixed structure and a target device via an ad hoc network implemented on a network or by a method as described above.

The invention further provides a communication path routing system in an extended telecommunications network including first and second fixed structures remote from one another and one or more ad hoc telecommunications network in which the or each ad hoc telecommunications network provides a communications route between the fixed structures. As a result other routes carrying heavy data traffic can be circumvented. At least one fixed structure preferably maintains a routing table including downlink and uplink gateway devices within the or each ad hoc telecommunications network providing a communications route to another fixed structure and the or each ad hoc network preferably includes a manager device providing dynamically up-dated routing information for the fixed structure routing table.

According to another aspect of the invention there is provided a method of caching data in an ad hoc telecommunications network in which a first device accesses a data file and the data file is cached on one or more devices on the network for subsequent retrieval. As a result data can be distributed across the network reducing the number of downloads/up-links by the network.

The data file may be cached on the device that accessed it or the caching of the data file may be shared amongst at least two devices in the network allowing large files to be cached.

Preferably the network includes a manager device which determines where the data file is cached and the manager device preferably determines where the data is cached based on available cache space in each device on the network, data file size and/or data file type. For example the manager device may associate a data retrieval cost with each data file and determine whether the data file should be subsequently cached based on that data retrieval cost. Intelligent data management is thus achieved.

The invention further provides an ad hoc telecommunications network arranged to operate a method as described above.

Embodiments of the invention will now be described, by way of example, with reference to the drawings of which:

FIG. 3 is a flow chart showing initiation of network management;

FIG. 4 is a flow chart showing the election process for a network manager;

FIG. 5 is a flow chart showing network management when a manager device is switched off.

FIG. 6 is a flow chart showing network management when the manager and vice manager are switched off;

FIG. 7a is a block diagram showing network manager memory organisation;

FIG. 7b is a flow chart showing data cache management in the network;

FIG. 8 is a flow chart showing data retrieval from the network;

FIG. 9 is a flow chart showing data access from the network;

FIG. 10 is a block diagram showing the stack for each network device;

FIG. 11 shows a plurality of mobile devices communicating with a base station;

Figure 13A:
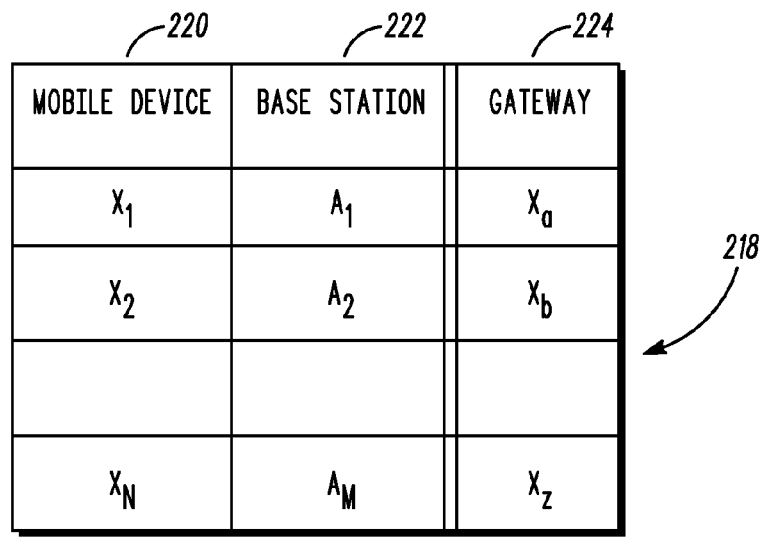
Figure 13B:
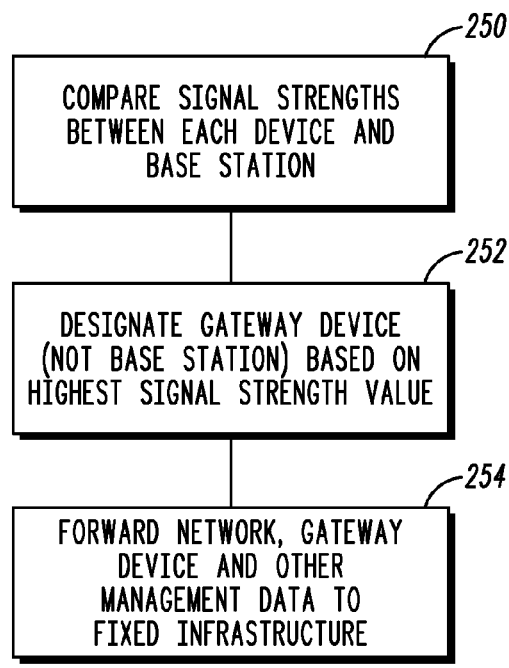

FIG. 13*a* shows a dynamic location table for message routing;

FIG. 13*b* is a flow chart showing management of gateway device data; and

Figure 14:
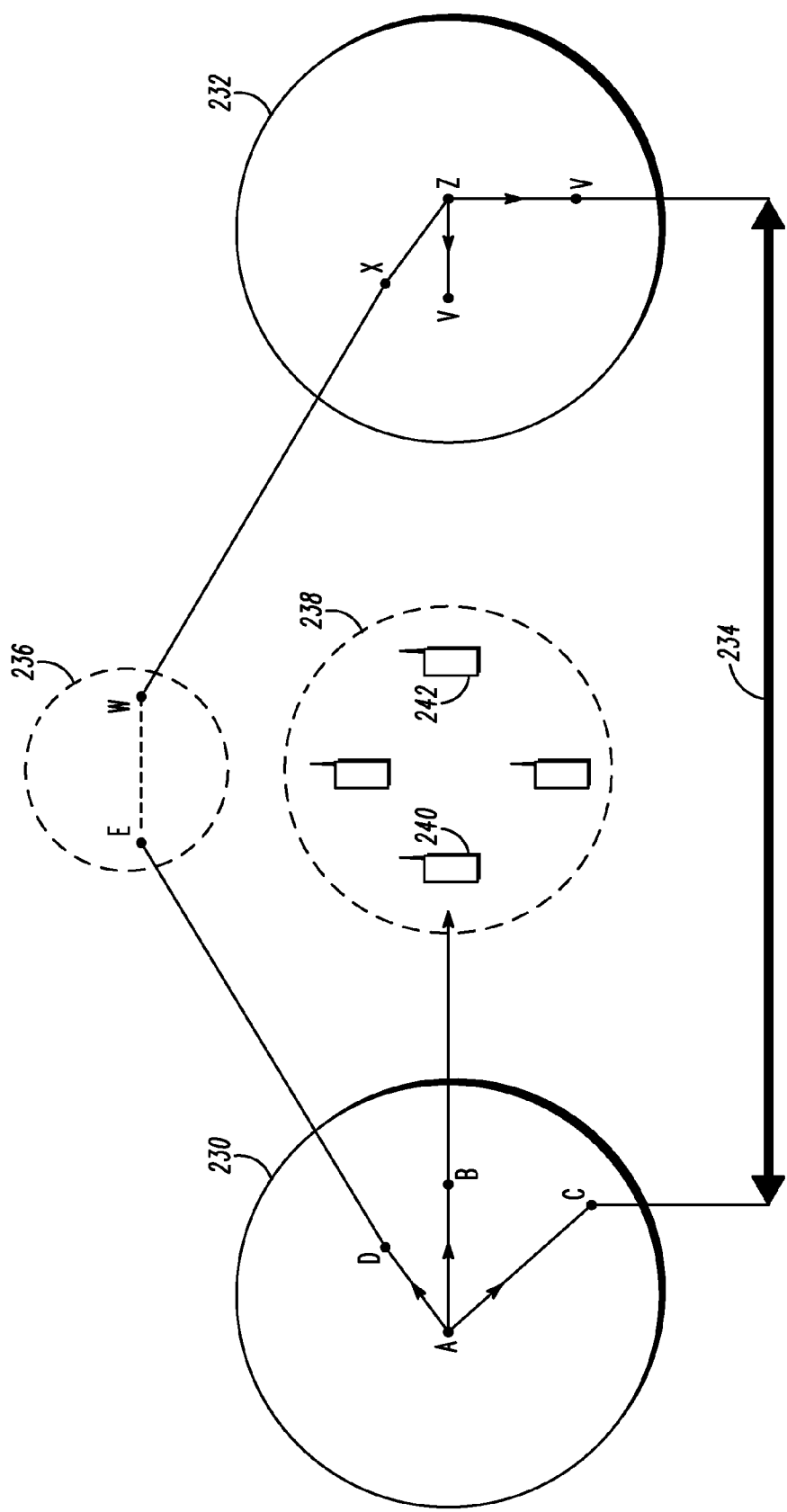

FIG. 14 shows diagrammatically various network routes between two nodes.

In the following discussion of an embodiment of the present invention in the context of ad hoc networks, reference is made to the Bluetooth protocol. This is exemplary only and it will be appreciated that the discussion applies equally to any other protocol or system supporting ad hoc networks including, but not limited to, Bluetooth 2, HiperLAN and the like.

Figure 2:
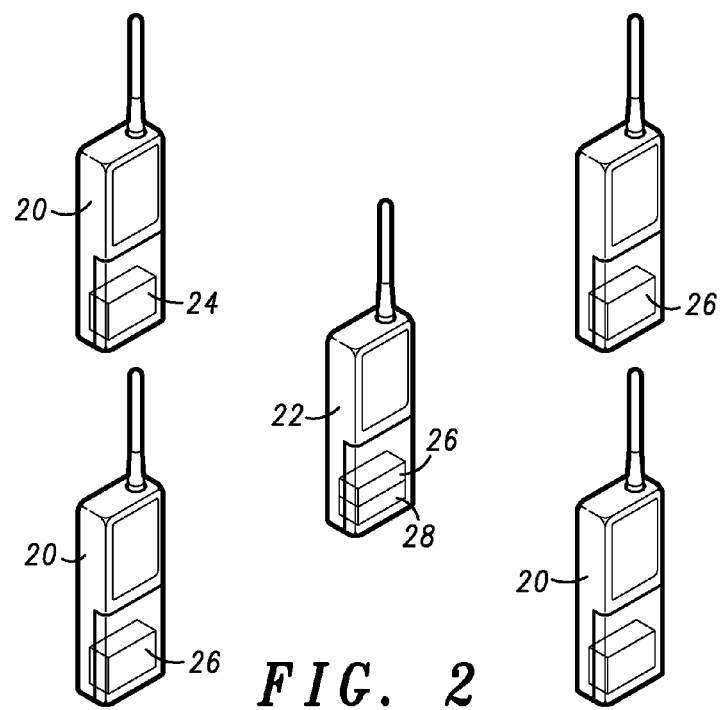
FIG. 2 shows an ad hoc network according to the present invention.

Referring to FIG. 2, an ad hoc network according to the present invention includes a plurality of devices 20 (all mobile devices in the embodiment shown) together with a manager device 22 and a vice manager device 24. As discussed in more detail below the manager manages the network and in particular data storage and retrieval on the network, and the vice manager is the fall back device in case the manager leaves the network. Election of the manager and vice manager is dynamic and up-dated on the basis of the most eligible devices, for example the devices with best averaged received signal strength although other parameters may be used as appropriate and/or necessitated by the operating system used.

The flow diagram of FIG. 3 shows the network initiation steps and in particular the introduction to and departure from the network by the constituent devices (which can of course include the manager itself).

At initialisation step 30 two devices A and B come into range of one another, and each device notifies whether it is part of an existing ad hoc network. If not then at step 34 a new ad hoc network is created. If yes then the other device is added to the existing network at step 32. In the third possibility where both devices are in existing networks then the two networks are merged at step 36.

In each case manager status needs to be dynamically updated and this can be done, for example, by comparing the received signal strengths at each device to assess which device receives the highest average power from the other devices. This value is representative of the optimum location of a device within the group and in many cases will correspond to the device located physically centrally within the network.

Where a new network of devices A and B has been formed (at step 34) the devices compare average received signal strength at step 38 and the device with the higher value is elected as manager at step 40. At step 41 the other device is elected vice manager although this status will be redundant unless further devices join the network.

Where one of the devices has been added to an existing network incorporating the other device at step 32 then the received signal strength for the additional device is compared with that of the existing manager and vice manager at step 42 as discussed in more detail in FIG. 4 to see whether manager status within the network should change.

Where two existing networks merge at step 36 then, in a first step 44, the average received signal strength values for the existing managers for each network are compared. At step 46 the manager with the lower value transfers its data to the manager with the higher value, which data is merged with the existing data on the higher value manager. The nature of this data is described in more detail below. Subsequently the election process is started again for the merged networks at step 48 as discussed in relation to FIG. 4 below.

FIG. 4 shows the dynamic election process for continual manager and vice manager status up-date. The assessment effectively takes place each time a non-manager device communicates with the manager. In that case, as shown at step 60, the data received includes a value representative of the average of the received signal power at device X, $SSV_X$. At step 62 this value is compared against the corresponding current value for the manager itself, $SSV_M$. If the value for device X is greater then at step 64 device X becomes the new manager. This new manager identity is communicated to the other devices in the network at step 65 and at step 66 the old manager transfers all of its management data to device X. The loop is then repeated each time a network device communicates with the new manager.

The manager also retains the identity of the vice manager device together with the value of its average received signal strength value $SSV_{VM}$. In the event that at step 62 the signal strength value for device X does not exceed that of the manager device then at step 68 the value $SSV_X$ for device X is compared against the vice manager value $SSV_{VM}$. If the value for device X is greater then at step 70 the manager registers device X as the new vice manager and stores its equivalent signal strength value as the new vice manager signal strength value.

As a result the identity of the manager is dynamically updated to cater for devices moving in and out of range of the network, being switched off, losing power or signal strength or otherwise varying the parameters of the network such that the device receiving the best average signal is always retained as manager, and a backup device is also retained as vice manager. The dynamic initialisation and continual assessment and update systems described with reference to FIGS. 3 and 4 are well suited to fit in with the communication methods of ad hoc networks. For example with regard to Bluetooth, the channel is divided into time slots of 625 microseconds in length corresponding to 1600 hops per second. Even in non-active states, therefore, polling will take place numerous times each second such that the network can respond quickly to parameter variation. The system can be set out such that a signal strength value is not issued each time a device transmits but at greater intervals, for example every nth transmission. These intervals can be fixed or can vary dependent on remaining power or nature of the device or network—for example a network of quasi-static devices such as workplace laptops there is less movement of devices and hence less regular need for updating of manager status.

Similarly, the initialisation mode described with reference to FIG. 3 is conveniently supported by existing ad hoc network structures. Referring once again to Bluetooth, where two devices make connection they are in inquire/inquiry scan sub-states. One of the devices in inquiry scan sub-state senses an inquiry and responds with address and clock information. The responding device thus becomes slave device and the initiating device the master device. Thereafter a paging sub-routine commences after which the devices enter into the connection state. In order to incorporate the network manager system of the invention it is simply necessary to add suitable data in the initiation data to indicate whether each device is in an existing network and which device is master device in each network, and subsequently to incorporate data representative of the average received signal strength values at each device in each or selected communication packets, at least to the manager device. The management system can run generally independently of the master/slave communication protocol or can occupy a channel or packet field within the system.

Similarly, the comparison of average received signal strength values is easily carried out in the context of existing ad hoc networks as well. For example under Bluetooth a Received Signals Strength Indicator (RSSI) is utilised in each device according to which the output power of the unit is selected dependent on the received signal strength from each unit. As a result the network manager can base calculation on the same value used to determine the output power for each device. Alternatively each device can transmit a value representative of its output power and comparison can be based directly on this parameter.

FIG. 5 represents the steps taken when the manager is disconnected for example by being switched off. Where manager status is dynamically reassessed at a high rate, it is unlikely that the manager will be able to leave the network physically before the decreasing received signal strength was effectively identified and transfer of manager status had taken place. At step 80 the manager device is switched off. However part of the closing down procedure within the manager includes the transfer of the management data to the designated vice manager at step 82. The vice manager is then elected as the new manager at step 84 and a polling round is commenced to identify the new vice manager based on a comparison of the received signal strength of each of the remaining devices in the network at step 86. At step 88 the new vice manager is elected after which the network re-enters the continual assessment state shown in FIG. 4. In an alternative embodiment, instead of undergoing a polling round to identify the vice manager, the first device that communicates with the new manager is automatically elected as vice manager after which the continual assessment loop of FIG. 4 is re-entered such that any subsequent device more eligible than the current vice manager is identified as soon as they communicate with the manager.

The worst case scenario occurs if the manager and vice manager are disconnected at the same time. In that case, as shown in FIG. 6, the devices are switched off at step 100 and at step 102 a polling round of the remaining devices is carried out to compare average received signal strengths across the devices to elect a new manager and vice manager at step 104 after which the network re-enters the continual assessment loop shown in FIG. 4. It will be seen that the polling round referred to in FIGS. 5 and 6 is similar to that described in FIG. 3 where two devices form a network for the first time (steps 34,38 and 40) although, of course, more devices can be involved where an existing network is effectively reconfigured.

Reverting to FIG. 2, a representation of the network can be seen including a manager device 22 and a vice manager 24. Here they are shown as nominally the most central devices, physically, in the network although as stressed above other factors may influence which devices are elected by virtue of average received signal strength.

The manager stores additional data relating to the network as shown in FIG. 7a. In addition to the standard device data held by any device in the network (including for example master or slave status-related data in a Bluetooth piconet) the manager stores additional data in various fields. This includes a value representative of the most relevant average received signal strength for the manager device $SSV_M$ (112) the corresponding signal value for the currently designated vice manager, $SSV_{VM}$ (114), the vice manager identity details for example its MAC address (116) and a list of cached data locations for data distributed about the ad hoc network as seen in expanded position 120.

Each member device within the network has the capability of caching data locally which is relevant to the network as a whole or other members of the network, and in practice a significant amount of data is likely to be cached locally in this way. Accordingly, in the manager table 120 two fields are shown as data reference field 122 in which data references 124 are stored, and a device (ID) field 126 giving the corresponding device ID 128 in which the data itself is cached.

Any type of data may be cached on the network. For example one device may have downloaded a video or audio file, one or more pages from a website, a PDF file and so forth. If other devices require access to this data then, rather than creating an up-link and downloading the data once again from the original source, it may be significantly quicker and more efficient to access it from the device which previously cached it. In that case the data storage table held by the manager device can be used to locate and access the data as described in more detail below. It will be appreciated that the manager device can carry out additional tasks beyond maintaining an updated data location table. For example the manager device can assess the types of data to be cached and/or where the data should be cached within the devices on the network. Referring to FIG. 7b, at step 142 a device X downloads data for example from the Internet for access by the device user. At step 144 device X sends related information corresponding to the data to the manager device. This information can include information about the type of data (text file, video, executable file etc.), the size of the data and the "cost" for example in terms of the on-line time required to download it. Based on this the manager device assesses whether the data should be cached for future use within the network. This decision, for example, can be based on a comparison of the available cache memory within the network as against the downloading price. At step 146, if the manager device established that the data should be cached, it identifies a cache location. This can simply be on the device that downloaded the data, or on another device which has appropriate memory or, in the case of large files, the cache load can be shared amongst several devices. In that case the manager device preferably carries additional data fields in its data location list including the free memory space on each device to the network. This information can be passed to the manager device by each other device either with each communication packet, or each time the cache memory size changes on a given device.

The method in which this data is organised and distributed around the network is shown in FIG. 8. At step 130 device X caches data in memory. At step 132 device X issues a packet indicating that it has cached data and providing a URL as reference to the cached data. The manager device stores the data reference in memory 120 (FIG. 7a) with an appropriate related field carrying the device identity at step 134. If any other device (Y) needs to access the cached data (136) it can poll the manager with the relevant data reference (bearing in mind that the manager ID is stored at each device and dynamically updated). The manager will provide the identity of device X such that the other device (Y) can access the data directly at device X (steps 138, 140). In an alternative embodiment which increases the communication overhead for the manager, once the request is received from a device to access the data, the manager can cause the data to be transferred from the device caching it either directly to the requesting device or via the manager. Where data is shared amongst several devices the manager manages its reassembly.

The data management regime extends further to removal of data from a device cache, or exit from or entry into the network by a device (either by moving out of/into range of the network or by being switched off/on). As shown in FIG. 9, a device removes data from its cache at step 150 and issues a packet to the manager indicating that the data having the given data reference has been deleted (step 152). The manager device at step 154 updates its cache data list removing the data reference and related device identity field. When a device enters the network then, in addition to the initiation steps discussed with reference to FIG. 3, the existing manager requests a list of all cached data from the entering device and the manager stores the data references and related device identity fields in its list of cached data locations. When a device exits the network the manager up-dates its cached data list accordingly by deleting the cached data references having corresponding related device identity fields. This can be as part of a sub-routine if the member device is simply switched off in which case it will send a notification signal to the manager device before going down. If the member device is leaving the network then, for example, a delete command can be generated in the manager device if the member device received signal level drops below a predetermined value.

In addition the manager device can maintain a time-out system such that if no signal is received from a given device within a period which is a multiple of the longest interval between communications from any device then the device is deleted from the network. Of course this will be dependent upon the protocols within the system used and may be disabled in systems where a long stand-by period is available in power-saving modes. Alternatively or in addition the manager can monitor a value representative of the relative position of each remote device, for example the power level required by the remote device to transmit to the manager device. A threshold power level can be determined, for example based on the system or communication protocol parameters, indicating that the remote device is moving out of range when its transmit power exceeds the threshold. When this threshold is reached the manager device will start a time-out period. If the transmit power required remains above the threshold beyond the time-out period then the device is considered as having left the network and its data is removed from the location table maintained at the manager device. However if the signal drops below the threshold value within a time-out period this represents the device returning into range such that its membership of the network is unaffected. As a result the system can identify and compensate for devices which move out of range, or out of useful range, for more than a predetermined period, but allows devices to move to the parameter of the network and beyond for a short time.

As a result the manager retains an up-dated list of all the data cached in the network together with related field identity where the data is cached for access by any other device in the network. As can be seen in FIG. 2, each member device caches its own data 26 and in addition the manager device 22 caches additional data 28 of the type shown in FIG. 7a.

The distributed, dynamic management system can be implemented using software agents maintained on each device. Referring to the diagram of FIG. 10 of a stack for a device including a physical layer 160 (base band, radio and so forth) an applications layer 164 (user interface) and a link layer 162 between the two, the software agent can reside with the applications layer. As software agents provide a distributed system and are configured to interact with one another transparent to the user of each device, they provide an appropriate platform for the distributed management tasks and in particular distribution of the relevant data (device signal strength value, cache data, available memory, addition/deletion request and so forth). In addition the software agent for each device manages the data currently cached in the device and can also manage data representing the effective position of the device within the network based on received single strength values for other devices and that stored for the host device.

Figure 1:
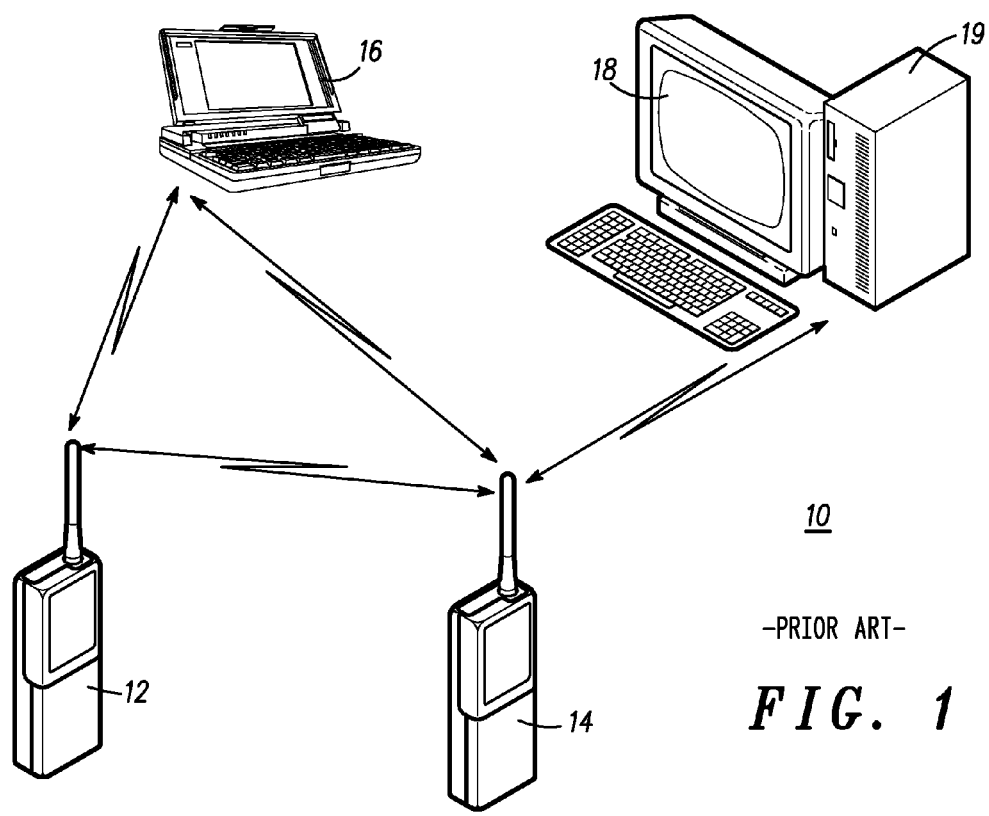
FIG. 1 shows a heterogeneous ad hoc network of a known type.

The present invention further addresses the issue of an ad hoc or private network being accessed by the fixed network infrastructure ("downlink"), for example via a fixed access point to a network such as the Internet. The ad hoc network may be dynamically changing as discussed above, or may constitute a quasi-static group of devices in the sense that devices are not continually entering or leaving the network. In either case, however, there is the additional issue of mobile devices remaining physically within the ad hoc network but moving physically into and out of range of the fixed access point, or having other parameters that vary such that the integrity of the wireless connection with the access point varies. An ad hoc network communicating with a fixed access point is shown in, for example FIG. 1 where mobile devices 12, 14 and 16 communicate with a fixed PC 18 comprising an access point to a fixed infrastructure designated generally 19.

The arrangement shown in FIG. 11 is now generally described in which a plurality of mobile devices 170 form an ad hoc network generally designated 172. The network is in communication with an access point 174 to a base station 218 in the fixed infrastructure via the physically closest of the devices, 176. The other members of the ad hoc network 172 communicate with the fixed infrastructure ("uplink") via the "gateway" device 176.

However, a problem arises when a down-link is required from the fixed infrastructures to a device in the ad hoc network not in direct communication range with the fixed infrastructure.

This is dealt with in the present invention as described in more detail with reference to FIGS. 12 to 14 by providing additional routing information within the fixed infrastructure network to describe which path can lead to the target device for example by defining the appropriate gateway in the ad hoc network.

Figure 12:
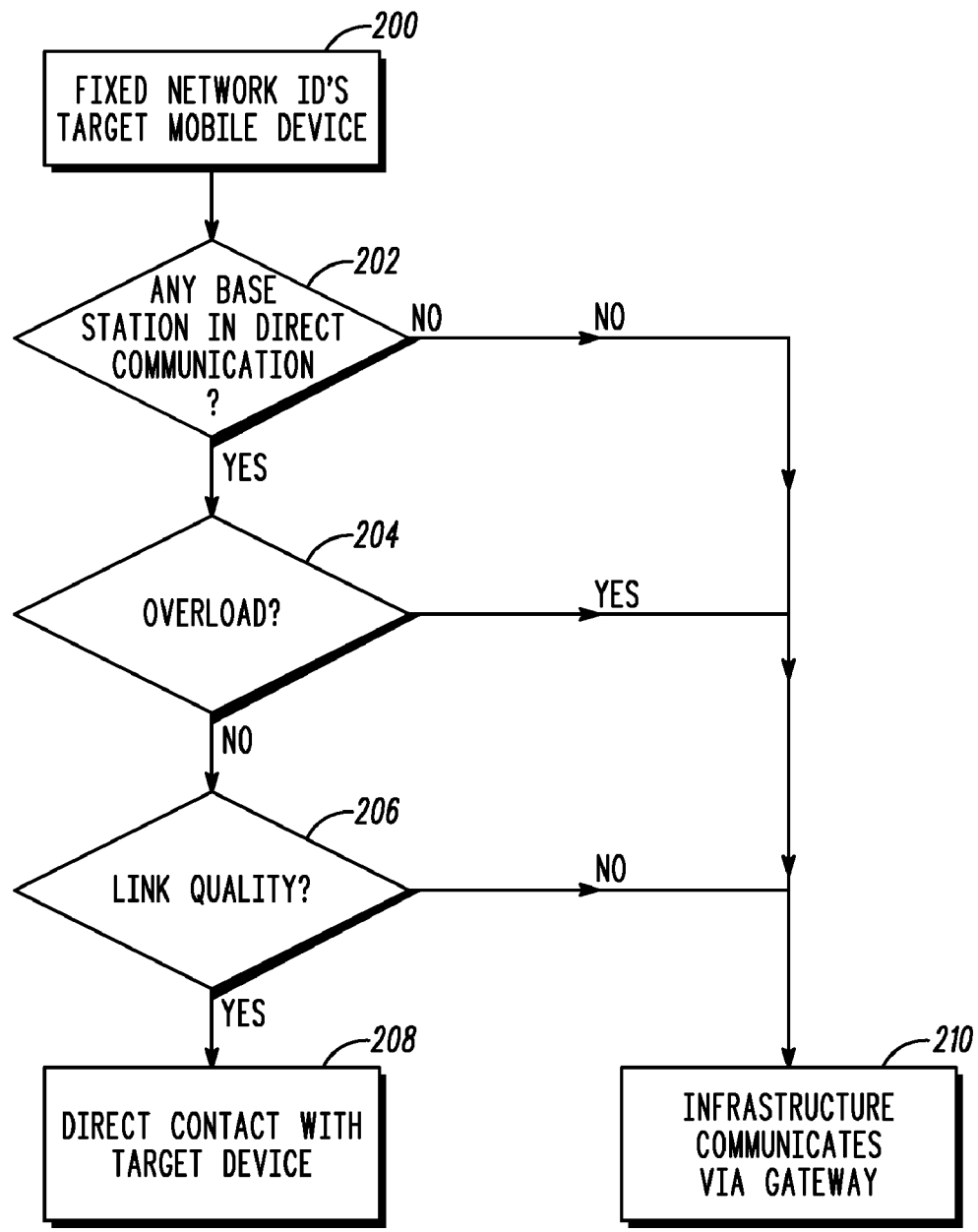
FIG. 12 is a flow chart showing message routing within the network.

FIG. 12 shows the basic routine adopted by the fixed infrastructure. At step 200 the fixed network identifies the target mobile device. At step 202 the fixed network establishes whether any of its base stations/access points are in direct communication with the device and if so a check is made to ensure that the base station cell is not overloaded (step 204). If there is no overload then the link quality is assessed at step 206 and if this is also sufficient then direct contact is made with the target mobile device at step 208 via the base station. If, however, any of these checks fail then the routine proceeds to step 210 under which the infrastructure downlinks via a predetermined gateway determined as discussed in more detail below.

A dynamic location table 218 maintained at the fixed network to determine the ad hoc network gateway is shown in FIG. 13a. The table includes at least three fields, a first field 220 with the mobile device identifiers, a second field 222 defining the best base station for the mobile device where there is more than one base station to the fixed infrastructure (bearing in mind that a base station may be the best path for more than one mobile device) and a gateway field 224 identifying the appropriate mobile device which can be used as a gateway to access a target device in the same ad hoc network. It will be noted that the base station and gateway fields may not be directly linked as a first base station may be used to access the target device directly but, where it is necessary to use a gateway device, another base station may be more appropriate for the desired gateway device. Referring back to FIG. 12, therefore, if it is determined that a gateway needs to be used then the infrastructure can assess the relevant base station to access the gateway by referencing the base station corresponding to the gateway device ID in the mobile device field 220.

The localisation table of FIG. 13a is dynamic in order to keep track of movement of mobile devices and networks in and out of range of respective base stations. Dynamic up-dating of the table may be carried out, for example, by periodic polling of the devices in the mobile device field 220 to determine whether they are directly reachable, if so via which base station (for example by comparing received signal strength with each base station) and if not, by establishing the ad hoc network to which each device belongs, and the appropriate gateway mobile device to that network (the base station for which will have been assessed as this will be directly reachable by the fixed infrastructure). Similarly, as devices or networks come into range or out of range the table is up-dated accordingly.

It will be seen that this gateway structure can be incorporated into the ad hoc device management structure described above, for example by incorporating gateway identification into the distributed management tasks of the respective software agents for each device in the network. For example the manager device for the ad hoc network can be the designated gateway device for the ad hoc network. It can be envisaged, however, that in some circumstances the device manager, whilst being best placed for the ad hoc network, is not in fact in direct range of any base station to the fixed infrastructure even though other devices within the ad hoc network are. This can be dealt with in one of two ways. Firstly the ad hoc network can be defined in the management scheme as including any base stations in range such that the manager device must be in contact with and hence able to act as gateway to the fixed infrastructure.

Alternatively as shown in FIG. 13b, if this is likely to prejudice operation of the ad hoc network in its stand-alone capability, which may be the case as the incorporation of a base stations may be viewed as a perturbation, then the manager device can, as part of its management task, compare signal strengths at step 250 between each of the mobile devices and the base station (as transmitted to it by each device each time is communicates), designate at step 252 a gateway device based on highest coverage received signal strength value or other parameter indicative of best-placed device, and forward at step 254 the device and network identity to the fixed infrastructure via the gateway device for up-dating of the localisation table. At the same time other management data cached in the manager device can be forwarded to the fixed infrastructure as appropriate. It will -be seen that this interrelationship between the ad hoc network management system and the gateway system ensures that the dynamic localisation table at the fixed network structure is up-dated at a frequency governed by the ad hoc networks rather than the fixed infrastructure, distributing the data gathering burden across the ad hoc network. In addition, in view of the frequency at which the ad hoc network dynamically up-dates management data, this provides a system able to compensate for considerable fluidity in ad hoc network formation and re-configuration. It will be noted that under this scheme the manager device can also be gateway device as it must be in contact with the base station, the average received signal strength value having taken the base station into account.

The ad hoc network gateway can extend to enhancing heterogeneous network routing according to traffic. As shown in FIG. 14, the route between two nodes on a network or on separate, connected networks may be through various paths. For example a node A on a local area network 230 may need to communicate with a node Z on a separate local area network 232. Various routes between the nodes may be available. For example the networks 230 and 232 may have respective access points C, Y to the Internet (designated 234) allowing connection through this route between the nodes A and Z, via respective Internet gateways C and Y. Furthermore an additional, separate intranet 236 may be connected to both networks via respective firewalls and conventional telephone lines and gateways D and X to the source and target networks 230 and 232 respectively and gateways E and W within the intranet 236. This multiple route configuration is well known on the world wide web and the routing of traffic through the various paths can be determined by the amount of existing traffic through nodes on the respective paths, to distribute traffic evenly and/or allow prioritisation of routes depending on data significance.

The provision according to the invention of a downlink to an ad hoc network via a gateway device on the ad hoc network allows the ad hoc network, or a grouping of ad hoc networks, to provide yet a further possible route for traffic between the nodes A and Z, where the respective intranets 230, 232 have base stations B, V. Referring again to FIG. 14, in the simplest arrangement an ad hoc network is located such that respective devices 240, 242 are within range of the respective base stations B,V, although the base stations are themselves not in communication with one another directly. Accordingly the ad hoc network 238 simply acts as another route between the base station and hence the node A,Z. The nature of the different types of routes can be transparent to the infrastructure such that the route via the ad hoc network is simply added to the list of alternatives possible routes to be used dependent upon comparative route traffic usage.

As far as the localisation table of the source network is concerned, the up-link gateway device from the ad hoc network to the target base station is effectively identified as the target device such that the appropriate base station and/or downlink gateway into the ad hoc network is determined as discussed in relation to FIG. 13 above.

Once again the distributed management structure for the ad hoc network can be used in conjunction with this heterogeneous network routing system. For example the manager device can include in its management device data the identity not only of devices acting as a downlink to a given fixed infrastructure but also devices acting as an uplink gateway to other fixed networks. This can be done simply by extending the network data table shown in FIG. 7 to include additional fields for uplink and downlink gateways together with the associated fixed networks to which they provide gateways. This table can be extended further when more than one ad hoc network (termed a "scatternet" within the Bluetooth (system) is involved such that alternative routings even within the extended ad hoc network can be identified. This table can be communicated from the manager device to manager devices in other ad hoc networks and localisation tables of the fixed networks dynamically as the data to which manager device up-dates allowing one or more roaming links between fixed networks to be added, and kept up to date, at the fixed networks.

As a result of this system a base station uplink to a first fixed structure can be viewed effectively as a mobile device by another fixed structure reachable by one or more intermediate connections. Routing of data, or individual data packets, can be determined dynamically on the basis of network traffic as with conventional Internet communication, for example.

It will be appreciated that the various aspects of ad hoc networks discussed above can be combined appropriately and that the technology and solutions discussed are not specific to any particular communication platform or network standard. The types of devices that can be incorporated in the network are not restricted to classic data/communication devices such as mobile telephones or computers but can extend to other devices, mobile or static, incorporating the necessary software and hardware as indeed contemplated under the Bluetooth standard. The test for manager or gateway device need not be based on highest average received signal strength value but can be derived from any parameter indicative of best placed device.

The invention claimed is:

1. An ad hoc telecommunications network comprising:
   a plurality of devices, in which downloaded user data is distributed and cached amongst the devices, each device communicates a data reference for data it caches;
   a device designated as manager device for managing the cached, user-downloaded distributed data, wherein the manager device designation is carried out dynamically based on a received signal strength value for each device from the other plurality of devices in the network, and wherein the manager device determines where the data is cached and stores a record of the data reference and data location for data distributed amongst the devices; and
   a designated vice manager device, in which, if the manager device transfers the record of data to the designated vice manager and leaves the network, the vice manager device is designated as the new manager device, wherein the first device that communicates with the new manager device is automatically elected as vice manager after which an assessment loop is entered such that any subsequent device more eligible than the current vice manager is identified upon communication with the manager device.

2. A network as claimed in claim 1 wherein a data file is shared amongst at least two devices in the network.

3. A network as claimed in claim 1, in which, as each device caches or deletes data it notifies the manager device which up-dates its record.

4. A network as claimed in claim 1, in which a non-manager device can request the location of data distributed amongst the devices from the manager device for direct or indirect access to that data.

5. A network as claimed in claim 4 in which the manager device, on leaving the network, transfers its manager device data to a newly designated manager device.

6. A network as claimed in claim 5 in which manager device capability is inherent in each device in the network and implemented by a respective software agent hosted by the device.

7. The ad hoc network of claim 1 further comprising a target device and a fixed structure in communication with at least one mobile device of the ad hoc network, in which the fixed structure maintains a table identifying a gateway device in the ad hoc network for communicating with the target device.

8. The ad hoc network of claim 1 wherein the manager device determines where the data is cached based on available cache space in each device on the network and the data file size.

9. The ad hoc network of claim 8 wherein the manager device associate a data retrieval cost with each data file and determine whether the data file should be subsequently cached based on that data retrieval cost.

10. The ad hoc network of claim 1 wherein if a non-manager device has a received signal strength value higher than the manager device, the manager devices transfers its record data to the non-manager device, wherein the devices then exchange roles as manager and non-manager device.

11. The ad hoc network of claim 7 wherein the manager device compares a request for fixed network data against its storage table of cached data in the local network and provides such data from the local network if available.

12. The ad hoc network of claim 1 wherein when a signal from a device in the network group falls below a predetermined threshold and a defined time limit is exceeded, then the manager device notes the loss of the data on that device by updating its record of data accordingly.

* * * * *